United States Patent
Isono

(10) Patent No.: US 8,951,667 B2
(45) Date of Patent: Feb. 10, 2015

(54) ELECTRODE ACTIVE MATERIAL AND MANUFACTURING METHOD OF SAME

(75) Inventor: Motoshi Isono, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 877 days.

(21) Appl. No.: 12/527,199

(22) PCT Filed: Feb. 15, 2008

(86) PCT No.: PCT/IB2008/001093
§ 371 (c)(1),
(2), (4) Date: Aug. 14, 2009

(87) PCT Pub. No.: WO2008/102271
PCT Pub. Date: Aug. 28, 2008

(65) Prior Publication Data
US 2010/0015525 A1 Jan. 21, 2010

(30) Foreign Application Priority Data
Feb. 19, 2007 (JP) ................................. 2007-037882

(51) Int. Cl.
*H01M 4/02* (2006.01)
*H01B 1/02* (2006.01)
(Continued)

(52) U.S. Cl.
CPC ............. *H01M 10/052* (2013.01); *C01B 25/45* (2013.01); *H01M 4/5825* (2013.01);
(Continued)

(58) Field of Classification Search
USPC ........... 429/209, 218.1, 221, 224, 225, 231.6, 429/231.8, 231.9, 231.95; 252/518.1, 252/519.14; 423/299, 304, 312
See application file for complete search history.

(56) References Cited

U.S. PATENT DOCUMENTS

| 5,705,296 A | * | 1/1998 | Kamauchi et al. ............ 429/330 |
| 2002/0114754 A1 | * | 8/2002 | Hosoya et al. ................ 423/306 |

(Continued)

FOREIGN PATENT DOCUMENTS

| CA | 2 543 711 | 5/2005 |
| CA | 2 550 496 | 7/2005 |

(Continued)

OTHER PUBLICATIONS

Notification of the First Office Action for Chinese Appl. No. 200880005413.1 dated Jan. 12, 2011.

(Continued)

*Primary Examiner* — Carlos Barcena
(74) *Attorney, Agent, or Firm* — Finnegan, Henderson, Farabow, Garrett & Dunner, LLP

(57) ABSTRACT

Electrode active material of the invention is mainly an amorphous transition metal complex represented by $A_xMP_yO_z$ (where x and y are values which independently satisfy $0 \leq x \leq 2$ and $0 \leq y \leq 2$, respectively, and $z=(x+5y+\text{valence of M})/2$ to satisfy stoichiometry; also, A is an alkali metal and M is a metal element selected from transition metals), and has a peak near 220 $cm^{-1}$ in Raman spectroscopy. Applying the electrode active material of the invention to a nonaqueous electrolyte secondary battery increases the capacity of the nonaqueous electrolyte secondary battery.

6 Claims, 4 Drawing Sheets

(51) Int. Cl.
  *H01M 10/052* (2010.01)
  *C01B 25/45* (2006.01)
  *H01M 4/58* (2010.01)
  *B01J 27/185* (2006.01)
  *B01J 35/00* (2006.01)
  *H01M 10/0525* (2010.01)

(52) U.S. Cl.
  CPC .......... *B01J 27/1853* (2013.01); *B01J 35/0033* (2013.01); *H01M 10/0525* (2013.01); *H01M 2004/027* (2013.01); *Y02E 60/122* (2013.01)
  USPC ........ 429/209; 429/218.1; 429/221; 429/224; 429/225; 429/231.8; 252/518.1; 252/519.14; 423/299; 423/304; 423/312

(56) References Cited

U.S. PATENT DOCUMENTS

2004/0033360 A1  2/2004  Armand et al.
2006/0127767 A1*  6/2006  Gauthier et al. ............... 429/221
2006/0194113 A1*  8/2006  Okada et al. ............... 429/231.9

FOREIGN PATENT DOCUMENTS

| CN | 1585168 | 2/2005 |
| CN | 1875506 | 12/2006 |
| EP | 0 571 858 A | 12/1993 |
| EP | 1 193 787 A | 3/2002 |
| JP | 2002-110161 | 4/2002 |
| JP | 2005-158673 | 6/2005 |

OTHER PUBLICATIONS

Notification of Reason(s) for Refusal for Korean Appl. No. 10-2009-7017147 dated Mar. 29, 2011.

Office Action for Canadian Patent Appl. No. 2,678,701 dated Mar. 6, 2012.

\* cited by examiner

US 8,951,667 B2

ELECTRODE ACTIVE MATERIAL AND MANUFACTURING METHOD OF SAME

CROSS-REFERENCE TO RELATED APPLICATIONS

This application is a national phase application of International Application No. PCT/IB2008/001093, filed Feb. 15, 2008, and claims the priority of Japanese Appliction No. 2007-037882, filed Feb. 19,2007, the contents of both of which are incorporated herein by reference.

BACKGROUND OF THE INVENTION

1. Field of the Invention

The invention relates to high capacity electrode active material which is mainly an amorphous transition metal complex represented by $A_xMP_yO_z$, and a manufacturing method of that electrode active material.

2. Description of the Related Art

A secondary battery is known which charges and discharges by cations such as lithium ions traveling between electrodes. One classic example of such a secondary battery is a lithium-ion secondary battery. Material that can absorb and release lithium ions can be used for the electrode active material of such a secondary battery. One example of such material is carbonaceous material such as graphite which is an example of negative electrode active material. On the other hand, an example of positive electrode active material is an oxide which has lithium and a transition metal as constituent elements, such as lithium nickel oxide or lithium cobalt oxide (hereinafter, such an oxide may also be referred to as a "lithium-containing composite oxide"). Moreover, in recent years, chemical compounds having an olivine structure, e.g., chemical compounds represented by the general expression $LiMPO_4$ (M=Mn, Fe, Co, Cu, V), are promising for positive electrode active material due in part to their large theoretical capacity.

Meanwhile, Japanese Patent Application Publication No. 2005-158673 (JP-A-2005-158673) describes electrode active material which is mainly an amorphous metal-phosphate complex that has an olivine structure. With the electrode active material that is mainly a metal-phosphate complex, an amorphous body can be synthesized from an inexpensive metal oxide at an extremely low cost and in a short period of time by rapid cooling compared with a crystalline body of related art. What is more, the resultant amorphous body seems to display the same battery properties as the crystalline body.

However, electrode active material that is mainly an amorphous metal-phosphate complex is not able to realize its theoretical capacity. As a result, its capacity remains small so the desired charging and discharging characteristics are unable to be obtained.

EP-A2-1,193,787 and US 2004/0033360 discloses an LiFePo 4 carbon composite material which is prepared by mixing various reactants and amorphous carbon material and milling the reactants using a planatory ball mill. The milled mixture is then sintered prior to being cooled.

SUMMARY OF THE INVENTION

This invention thus provides electrode active material that is mainly an amorphous iron-phosphate complex represented by $A_xMP_yO_z$, and a high capacity nonaqueous electrolyte secondary battery by applying that electrode active material.

A first aspect of the invention relates to electrode active material in which a main constituent thereof is an amorphous transition metal complex represented by $A_xMP_yO_z$ (where x and y are values which independently satisfy 0≤x≤2 and 0≤y≤2, respectively, and z=(x+5y+valence of M)/2 to satisfy stoichiometry; also, A is an alkali metal and M is a metal element selected from transition metals), and which has a peak near 220 $cm^{-1}$ in Raman spectroscopy.

According to this first aspect of the invention, high capacity electrode active material can be obtained by making electrode active material which is mainly a amorphous transition metal complex represented by $A_xMP_yO_z$ have a peak near 220 $cm^{-1}$ in Raman spectroscopy.

Also, in the amorphous transition metal complex represented by $A_xMP_yO_z$ a peak intensity ratio of a peak intensity (I220) of 220 $cm^{-1}$ to a peak intensity (I980) of 980 $cm^{-1}$ in Raman spectroscopy may be (I220/I980)>0.6.

Accordingly, high capacity electrode active material can be obtained by making electrode active material which is mainly a amorphous transition metal complex represented by $A_xMP_yO_z$ be such that the peak intensity ratio (I220/I980) of a peak intensity (I220) of 220 $cm^{-1}$ to a peak intensity (I980) of 980 $cm^{-1}$ in Raman spectroscopy is (I220/I980)>0.6.

Also, a second aspect of the invention relates to a manufacturing method of electrode active material having as a main constituent an amorphous transition metal complex represented by $A_xMP_yO_z$ (where x and y are values which independently satisfy 0≤x≤2 and 0≤y≤2, respectively, and z=(x+5y+valence of M)/2 to satisfy stoichiometry; also, A is an alkali metal and M is a metal element selected from transition metals), which includes an amorphising step for obtaining the amorphous transition metal complex by rapidly cooling a melt having the $A_xMP_yO_z$ composition, and a short-range order changing step for changing a short-range order of an amorphous structure by performing a process of applying mechanical energy.

According to the second aspect of the invention, performing these steps is advantageous in that it makes it possible to more efficiently manufacture material that displays useful properties as electrode active material that realizes even higher capacity.

Also, the process of applying mechanical energy is performed using a ball mill. Using a ball mill to apply the mechanical energy enables mechanical energy that is strong enough to change the short-range order of the amorphous structure to be applied. As a result, the short-range order of the amorphous structure can be changed thus enabling large capacity electrode active material to be obtained.

Also, a conductivity modifier may be added to the amorphous electrode active material before completing the process of applying mechanical energy. Applying mechanical energy when a conductivity modifier has been added to the electrode active material enables electrode active material with superior conductivity to be obtained.

Also, a third aspect relates to a nonaqueous electrolyte secondary battery that includes the foregoing electrode active material.

According to the third aspect, a high capacity nonaqueous electrolyte secondary battery that has superior charging and discharging characteristics can be obtained by using the foregoing electrode active material that increases the capacity even further.

This invention enables high capacity electrode active material to be obtained from electrode active material that is mainly an amorphous iron-phosphate complex represented by $A_xMP_yO_z$.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

Figure 1:
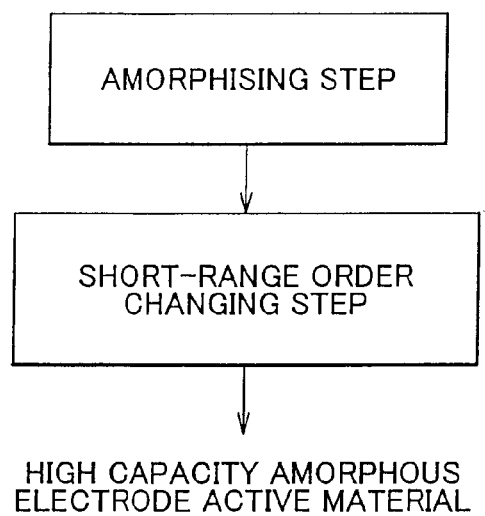
FIG. 1 is process chart illustrating a manufacturing method for high capacity electrode active material according to an example embodiment of the invention.

Hereinafter, electrode active material and a manufacturing method thereof according to an example embodiment of the invention will be described in detail.

First the electrode active material according to an example embodiment of the invention will be described. The electrode active material according to the example embodiment of the invention can be divided into two modes, which are: (1) electrode active material which is mainly an amorphous iron-phosphate complex represented by $A_xMP_yO_z$ (where x and y are values which independently satisfy $0 \leq x \leq 2$ and $0 \leq y \leq 2$, respectively, and $z=(x+5y+$valence of M$)/2$ to satisfy stoichiometry. Also, A is an alkali metal and M is a metal element selected from transition metals.), and which has a peak near 220 $cm^{-1}$ in Raman spectroscopy (the first mode), and (2) electrode active material which is mainly an amorphous iron-phosphate complex represented by $A_xMP_yO_z$ (where x and y are values which independently satisfy $0 \leq x \leq 2$ and $0 \leq y \leq 2$, respectively, and $z=(x+5y+$valence of M$)/2$ to satisfy stoichiometry. Also, A is an alkali metal and M is a metal element selected from transition metals.), and in which a peak intensity ratio of a peak intensity (I220) of 220 $cm^{-1}$ to a peak intensity (I980) of 980 $cm^{-1}$ in Raman spectroscopy is (I220/I980)>0.6 (the second mode). Hereinafter, the electrode active material according to this example embodiment of the invention will be described in detail divided into these modes.

As described above, the electrode active material of the first mode is electrode active material that is mainly an amorphous iron-phosphate complex which can be represented by $A_xMP_yO_z$ (where x and y are values which independently satisfy $0 \leq x \leq 2$ and $0 \leq y \leq 2$, respectively, and $z=(x+5y+$valence of M$)/2$ to satisfy stoichiometry. Also, A is an alkali metal and M is a metal element selected from transition metals.), and is characteristic in that it has a peak near 220 $cm^{-1}$ in Raman spectroscopy.

According to the first mode, high capacity electrode active material can be obtained by making electrode active material which is mainly an amorphous iron-phosphate complex, such as that described above, have a peak near 220 $cm^{-1}$ in Raman spectroscopy. Hereinafter, the electrode active material of this mode will be described in detail.

The transition metal complex of this mode can be represented by the following General expression (1).

$$A_xMP_yO_z \quad (1)$$

In this expression, x and y are values which independently satisfy $0 \leq x \leq 2$ and $0 \leq y \leq 2$, respectively, and $z=(x+5y+$valence of M$)/2$ to satisfy stoichiometry. Also, A is an alkali metal and M is a metal element selected from transition metals. Although in this General expression (1), x and y are values that independently satisfy $0 \leq x \leq 2$ and $0 \leq y \leq 2$, respectively, they are preferably within the ranges of $1 \leq x \leq 2$ and $1 \leq y \leq 2$, respectively.

Also, in General expression $A_xMP_yO_z$ (1), the value z is a value that is determined by the valence of the transition metal M and the values x and y to satisfy stoichiometry, and is expressed by the following Equation (2).

$$z=(x+5y+\text{valence of }M)/2 \quad (2)$$

In Equation (2), when M is Fe, for example, the valence of M=Fe can take on either a value of 2 or 3. That is, the valence of iron is 2 in a non-oxidizing atmosphere, or more specifically, when the iron-phosphate complex is reacted in an inert or reducing atmosphere, and is 3 when it is reacted in an oxidizing atmosphere. Therefore, the iron takes on either a valence of 2 or 3 depending on the atmosphere.

In General expression (1) above, A may be one or two or more types of elements selected from alkali metals. More specifically, Li, Na, or K or the like may be used, preferably Li or Na, and more preferably Li.

Also in the General expression (1) above, M may be one or two or more types of elements selected from transition metals. More specifically, Fe, Ni, Co, Mn, or V or the like may be used, preferably Fe, Ni, Co or Mn, and more preferably Fe.

In this mode, the transition metal complex having the composition $A_xMP_yO_z$ (where x and y are values which independently satisfy $0 \leq x \leq 2$ and $0 \leq y \leq 2$, respectively, and $z=(x+5y+$valence of M$)/2$ to satisfy stoichiometry. Also, A is an alkali metal and M is a metal element selected from transition metals.) is amorphous. This amorphous transition metal complex is preferably amorphous to the extent that one or two or more of the following conditions are satisfied. (1) the average crystallite size is equal to or less than approximately 1000 Angstrom (preferably equal to or less than approximately 100 Angstrom, and more preferably equal to or less than 50 Angstrom); (2) the specific gravity of the transition metal complex is large at equal to or greater than approximately 3% (and more preferably equal to or greater than approximately 5%) compared to the specific gravity (theoretical value) when the transition metal complex is completely crystalline; and (3) no peak which supports the transition metal complex being crystalline can be observed in an X-ray diffraction pattern. That is, a classic example of the transition metal complex described here is mainly a lithium transition metal complex that satisfies one or two or more of these conditions (1) to (3). In this mode, the transition metal complex is preferably a lithium transition metal complex that satisfies at least condition (3). Incidentally, the X-ray pattern can be obtained using an X-ray diffractometer (XRD) (model number Rigaku RINT 2100 HLR/PC) that may be obtained from Rigaku Corporation, for example.

The amorphous transition metal complex in this mode is one which has a peak near 220 $cm^{-1}$ in Raman spectroscopy. The electrode active material can be made to have a high capacity by making the amorphous transition metal complex of this mode have a peak near 220 cm$^{-1}$ in Raman spectroscopy. This is achieved by changing the short-range order of the amorphous structure of the amorphous transition metal complex, which is done by applying mechanical energy, which will be described later. Here, the measurements by Raman spectroscopy were taken under the following conditions. Apparatus used: Nanofinder by Tokyo Instruments, Inc.; Laser beam: wavelength of 448 nm, output of 2.6 mW, Ar laser.

Incidentally, the use of the electrode active material according to this mode is not particularly limited. For example, it may be used as positive electrode active material of a nonaqueous electrolyte secondary battery which will be described later.

Next, the electrode active material of the second mode according to the example embodiment of the invention will be described. As described above, the electrode active material of the second mode is electrode active material which is mainly an amorphous iron-phosphate complex that can be represented by $A_xMP_yO_z$ (where x and y are values which independently satisfy 0≤x≤2 and 0≤y≤2, respectively, and z=(x+5y+valence of M)/2 to satisfy stoichiometry. Also, A is an alkali metal and M is a metal element selected from transition metals.), and is characteristic in that a peak intensity ratio of a peak intensity (I220) of 220 cm$^{-1}$ to a peak intensity (I980) of 980 cm$^{-1}$ in Raman spectroscopy is (I220/I980) >0.6.

According to this mode, high capacity electrode active material can be obtained by making an electrode active material which is mainly an amorphous iron-phosphate complex, such as that described above, have a peak intensity ratio (I220/I980) in Raman spectroscopy that exceeds 0.6. Hereinafter, the electrode active material of this mode will be described in detail.

Also, the General expression $A_xMP_yO_z$ (1) of the amorphous transition metal complex in this mode, as well as the values x, y, and z, and A and M, and the amorphous transition metal complex of this mode are the same as those in the first mode described above so a detailed description thereof will be omitted here.

The amorphous transition metal complex in this mode is one in which the peak intensity ratio (I220/I980) in Raman spectroscopy exceeds 0.6. Making the peak intensity ratio (I220/I980) in Raman spectroscopy exceed 0.6 in this way enables the electrode active material to have a high capacity and is achieved by changing the short-range order of the amorphous structure of the amorphous transition metal complex, which is done by applying mechanical energy, which will be described later. Although in this mode the peak intensity ratio (I220/I980) in Raman spectroscopy exceeds 0.6, it is preferably within the range of 0.8 to 1.4, and more preferably within the range of 0.9 to 1.2. Here, the Raman spectroscopy measurement conditions are the same as those in the first mode so a detailed described thereof will be omitted here.

Incidentally, the use of the electrode active material of this mode is not particularly limited. For example, it may be used as positive electrode active material of a nonaqueous electrolyte secondary battery which will be described later, just as in the first mode.

The method of manufacturing the electrode active material according to the example embodiment of the invention is not particularly limited as long as the electrode active materials of both the first and second modes are able to be obtained. For example, the electrode active material of the invention may be manufactured according to the following method.

A manufacturing method of the electrode active material according to the example embodiment of the invention is a manufacturing method of electrode active material which is mainly an amorphous iron-phosphate complex that can be represented by $A_xMP_yO_z$ (where x and y are values which independently satisfy 0≤x≤2 and 0≤y≤2, respectively, and z=(x+5y+valence of M)/2 to satisfy stoichiometry. Also, A is an alkali metal and M is a metal element selected from transition metals.). This manufacturing method includes an amorphising step for obtaining an amorphous transition metal complex by rapidly cooling a melt having the $A_xMP_yO_z$ composition as illustrated in FIG. 1, and a short-range order changing step for changing the short-range order of the amorphous structure by a process of applying mechanical energy.

According to the example embodiment of the invention, performing these steps is advantageous in that it makes it possible to more efficiently manufacture material that displays useful properties as electrode active material that realizes even higher capacity by being able to change the short-range order of the amorphous structure while maintaining the amorphous structure itself.

The manufacturing method of the electrode active material according to the example embodiment of the invention includes at least the amorphising step and the short-range order changing step described above. Hereinafter, each of these steps will be described in detail.

The amorphising step according to the example embodiment of the invention is a step for obtaining an amorphous transition metal complex by rapidly cooling a melt having the $A_xMP_yO_z$ (1) composition. Here, the $A_xMP_yO_y$ (1) is the same as that in the description of the foregoing electrode active material so a description thereof will be omitted here.

The method for rapidly cooling the melt used in this step (i.e., the melt rapid cooling method) is a method for amorphising a metal complex by rapidly solidifying the metal complex from a molten state. For example, a metal complex in a molten state is rapidly solidified by being put into a low temperature medium (such as ice water) so that it solidifies rapidly. More specifically, the single-roll method for rapidly cooling melt may be used, for example. This amorphising method may be repeated two or more times as necessary.

Normally this step is preferably performed in a non-oxidizing atmosphere such as an inert gas atmosphere of, for example, argon gas or nitrogen ($N_2$), or an atmosphere that includes a reducing gas such as hydrogen gas. Of these, an inert gas atmosphere of argon gas is preferable.

In the melt rapid cooling method, A raw material (such as an A compound), M raw material (such as an M oxide), and P raw material (such as a phosphate compound), which corresponds to the $A_xMP_yO_z$ may be used.

The A raw material used in this step is preferably Li raw material but is not particularly limited to this as long as it includes an alkali metal element. One or two or more kinds of Li compounds may be used as the Li raw material. The Li compound may be, for example, $Li_2O$, $LiOH$, or $Li_2CO_3$. Of these, $Li_2O$ is more preferable. This is because using this kind of lithium compound enables electrode active material corresponding to a state in which lithium has been absorbed beforehand to be obtained, and as a result, the irreversible capacity can be reduced. In addition, the melting point of the mixture can be reduced by selecting a lithium compound that can function as a flux or fusing agent.

Also, the M raw material used in this step is preferably Fe raw material but it is not particularly limited to this as long as it includes a transition metal element. One or two or more kinds of Fe oxide may be used as the Fe raw material. The Fe oxide may be, for example, FeO or $Fe_2O_3$ or the like, FeO being the more preferable.

Also, one or two or more kinds of phosphorous compound may be used as the P raw material that is used in this step. The phosphorous compound may be, for example, phosphorous oxide or phosphorous ammonium salt or the like, $P_2O_5$ being preferable.

The average particle diameter and particle diameter distribution and the like of the raw materials used in this step are not particularly limited. Also, generally the raw materials are preferably relatively uniformly mixed, and more preferably almost uniformly mixed. However, the raw material composition is melted once so even if it is not that uniform, it is still possible to manufacture electrode active material with sufficient uniformity for practical use. In this way, the method used in this example embodiment differs from the solid reaction method of the related art in that it suppresses the effects of the nature and uniformity of the raw material composition on the product material and the manufacturing conditions are easy to control.

Next, the short-range order changing step of this example embodiment of the invention will be described. The short-range order changing step in this example embodiment is a step for changing the short-range order of the amorphous structure by a process in which mechanical energy is applied to the amorphous electrode active material $A_xMP_yO_z$ obtained by the amorphising step.

Ball milling is preferably used as the method for applying mechanical energy in the example embodiment of the invention. Using the ball mill method enables mechanical energy that is strong enough to change the short-range order of the amorphous structure to be applied. As a result, high capacity electrode active material can be obtained by changing the amorphous structure of the short-range order.

When ball milling is used as the method for applying mechanical energy in this step, the atmosphere in the mill pot when performing the ball milling process may be a room air atmosphere, an argon (Ar) atmosphere, or a nitrogen ($N_2$) atmosphere. Of these, the room air atmosphere is preferable.

Also, the ball mill process can be performed for 1 hour or longer, with 1 to 8 hours being preferable, and 1 to 4 hours being even more preferable.

Also, the speed of the mill pot during the ball mill process can be equal to or greater than 100 rpm, but is preferably within the range of 100 to 500 rpm, and more preferably within the range of 200 to 300 rpm.

Further, examples of the material used for the mill pot in the ball mill process include Zr and SUS or the like. Of these, a Zr mill pot is preferable.

Examples of the material used for the ball in the ball mill process include Zr and SUS and the like. Of these, a Zr ball is preferable.

Also in this step, when applying the mechanical energy, it is preferable to also add a conductivity modifier (i.e., a conductivity improving agent) to the amorphous electrode active material $A_xMP_yO_z$ and then apply mechanical energy. More specifically, carbon black, acetylene black, ketjen black, or black lead or the like may be used as the conductivity modifier. Of these, acetylene black is preferable.

When adding the conductivity modifier and applying mechanical energy, it is preferable to first apply mechanical energy to only the electrode active material, then add the conductivity modifier, and then apply mechanical energy again. When ball milling is used as the method for applying the mechanical energy, the ball mill process after the conductivity modifier has been added may be performed for 1 hour or more, preferably between 1 and 6 hours, and more preferably between 1 and 3 hours.

The average particle size of the amorphous electrode active material $A_xMP_yO_z$ powder after the mechanical energy has completely finished being applied may be, for example, equal to or less than 50 μm, preferably within the range of 1 to 30 μm, and more preferably within the range of 1 to 10 μm.

Incidentally, whether the short-range order of the amorphous structure has changed can be inferred from the Raman spectroscopy obtained by Raman spectroanalysis as shown in an example that will be described later.

Next, a nonaqueous electrolyte secondary battery according to the example embodiment of the invention will be described. The nonaqueous electrolyte secondary battery of the example embodiment includes the electrode active material described above.

According to the example embodiment of the invention, it is possible to obtain a high capacity nonaqueous electrolyte secondary battery by using the foregoing electrode active material that realizes even higher capacity.

The nonaqueous electrolyte secondary battery according to the example embodiment of the invention is a nonaqueous electrolyte secondary battery that has a positive electrode containing the electrode active material, a negative electrode containing negative electrode active material, and a nonaqueous electrolyte. The nonaqueous electrolyte secondary battery according to the example embodiment of the invention is advantageous in that it can realize even higher capacity. Hereinafter, the reason why the nonaqueous electrolyte secondary battery of the example embodiment of the invention has this kind of advantage will be described. The nonaqueous electrolyte secondary battery according to the example embodiment of the invention is able to realize greater capacity by using the electrode active material that is mainly an amorphous iron-phosphate complex represented by $A_xMP_yO_z$ according to either the first or the second mode as the positive electrode active material. That is, it is thought that a nonaqueous electrolyte secondary battery that has superior charging and discharging characteristics which realizes greater capacity can be obtained by using the electrode active material in which the capacity has been improved by changing the short-range order of the amorphous structure through the application of mechanical energy as the positive electrode active material. Hereinafter, the nonaqueous electrolyte secondary battery according to the example embodiment of this invention will be described in detail for each structure.

First, the positive electrode used in the example embodiment of the invention will be described. The positive electrode used in the example embodiment of the invention at least has the electrode active material and also normally has a binder to hold the electrode active material.

Any well-known binder may be used. More specifically, the binder may be, for example, polyvinylidene-fluoride (PVDF), polytetrafluoroethylene (PTFE); polyvinylidene-fluoride-hexafluoropropylene copolymer (PVDF-HFP), a fluorine-containing resin such as fluoro-rubber, or a thermoplastic resin such as polypropylene or polyethylene. Also, the content of the binder of the positive electrode layer is, for example, within a range of 1 to 10 percent by mass, and preferably within a range of 3 to 7 percent by mass.

Also, the positive electrode may contain an additive in addition to the positive electrode active material and the binder. A conductive agent, for example, may be used as the additive. More specifically, carbon black, acetylene black, ketjen black, or black lead or the like may be used as the conductive agent. Of these, acetylene black is preferable.

Next, the negative electrode used in the example embodiment of the invention will be described. When the foregoing electrode active material is used as the positive electrode of the battery, a metal such as lithium (Li), natrium (Na), magnesium (Mg), aluminum (Al), or an alloy thereof, or carbon material that can absorb and release cations, or the like may be used as negative electrode active material for the counter electrode to the positive electrode. Furthermore, the negative electrode also normally has a binder to hold the negative electrode active material.

Also, examples of the binder used in the example embodiment of the invention include polyvinylidene-fluoride (PVDF) and styrene-butadiene rubber polymer (SBR), polyvinylidene-fluoride (PVDF) being the more preferable.

Further, the negative electrode may also contain an additive in addition to the negative electrode active material and the binder. A conductive agent, for example, may be used as the additive. More specifically, carbon black, acetylene black, ketjen black, or black lead or the like may be used as the conductive agent.

The nonaqueous electrolyte used in the nonaqueous electrolyte secondary battery according to this example embodiment of the invention may include a nonaqueous solvent and a compound (support electrolyte) that contains cations that can be inserted into and removed from electrode active material. The nonaqueous solvent of the nonaqueous electrolyte may be any of a variety of types of aprotic solvents such as a carbonate, ester, ether, nitrile, sulfone, or lactone type. Examples include propylene carbonate; ethylene carbonate; diethyl carbonate; dimethyl carbonate; ethyl methyl carbonate; 1,2-dimethoxyethane; 1,2-diethoxyethane; acetonitrile; propionitrile; tetrahydrofuran; 2-methyltetrahydrofuran; dioxane; 1,3-dioxolan; nitromethane; N, N-dimethylformamide; dimethylsulfoxide; sulfolane; and γ-butyrolactone. Only one type or a mixture of two or more types of nonaqueous solvent selected from among these kinds of nonaqueous solvents may be used. Also, a compound that includes cations that are inserted into/removed from the electrode active material may be used as the support electrolyte that constitutes the nonaqueous electrolyte. For example, with a lithium ion secondary battery, one or two or more types of lithium compounds (lithium salts) such as $LiPF_6$, $LiBF_4$, $LiN(CF_3SO_2)_2$, $LiCF_3SO_3$, $LiC_4F_9SO_3$, $LiC(CF_3SO_2)_3$, and $LiClO_4$ may be used.

The nonaqueous electrolyte secondary battery obtained from the example embodiment of the invention may be any of a variety of shapes, such as coin-shaped, laminated (stacked), or cylindrical.

Also, the nonaqueous electrolyte secondary battery according to the example embodiment of the invention can be used with high voltage, the range of the maximum voltage being, for example, within 1.5 to 5 V, preferably within 2 to 4.75 V, and more preferably within 2.5 to 4.5 V.

The purpose for which the nonaqueous electrolyte secondary battery according to the example embodiment of the invention is used is not particularly limited. For example, the nonaqueous electrolyte secondary battery may be used in an automobile.

Incidentally, the invention is not limited to the foregoing example embodiments. The foregoing example embodiments illustrate examples. Other examples having substantially the same structure as the technical ideas described within the scope of the claims for patent of the invention and displaying the same operation and effects are also included within the technical scope of the invention.

Hereinafter, the invention will be described in even more detail with the following examples.

EXAMPLE 1

Manufacture of Amorphous Electrode Active Material

LiOH as the Li raw material, FeO as the Fe raw material, and $P_2O_5$ as the P raw material were mixed together at a molar ratio of 2:1:1.5. This mixture was then melted for 1 minute at 1200° C. in an Ar atmosphere and then rapidly cooled with a Cu roll using a single-roll rapid cooling apparatus to obtain ribbon-shaped amorphous electrode active material $Li_xFeP_yO_z$. Then this ribbon-shaped amorphous electrode active material $Li_xFeP_yO_z$ was ground up using an agate mortar and pestle to obtain an amorphous electrode active material $Li_xFeP_yO_z$ powder.

(Ball Mill Process)

The ball mill process was performed at 300 rpm for 1 hour with only 1 gram of the amorphous electrode active material $Li_xFeP_yO_z$ powder, which was obtained by preparing the foregoing amorphous electrode active material, using a planetary ball mill P-7 from FRITSCH GmbH with a Zr ball and mill pot. Furthermore, 0.3571 grams of carbon (acetylene black) was added to the mill pot so that the relative proportion of electrode active material to carbon was 70:25 (percent by mass), and ball milling was performed again for 6 hours at 300 rpm such that electrode active material in which the short-range order of the amorphous structure was changed and having an average particle size of 1.7 μm was obtained.

EXAMPLE 2

Amorphous electrode active material was prepared as it was in Example 1 described above and amorphous electrode active material $Li_xFeP_yO_z$ was obtained. Next, the ball mill process was performed only on the electrode active material according to the same method as in Example 1 except for that the ball mill processing time was 4 hours. Then carbon was added after which the ball mill process was performed again according to the same method as in Example 1. As a result, electrode active material in which the short-range order of the amorphous structure was changed and having an average particle size of 1.5 μm was obtained.

EXAMPLE 3

Amorphous electrode active material was prepared as it was in Example 1 described above and amorphous electrode active material $Li_xFeP_yO_z$ was obtained. Next, the ball mill process was performed only on the electrode active material according to the same method as in Example 1 except for that the ball mill processing time was 8 hours. Then carbon was added after which the ball mill process was performed again according to the same method as in Example 1. As a result, electrode active material in which the short-range order of the amorphous structure was changed and having an average particle size of 1.3 μm was obtained.

COMPARATIVE EXAMPLE 1

Amorphous electrode active material was prepared as it was in Example 1 described above and amorphous electrode active material $Li_xFeP_yO_z$ with an average particle size of 2 μm was obtained. In this case, the ball mill process described above was not performed after the amorphous electrode active material $Li_xFeP_yO_z$ was ground to a powder using the agate mortar and pestle.

[Evaluation]
(X-Ray Diffraction Measurement)

Figure 2:
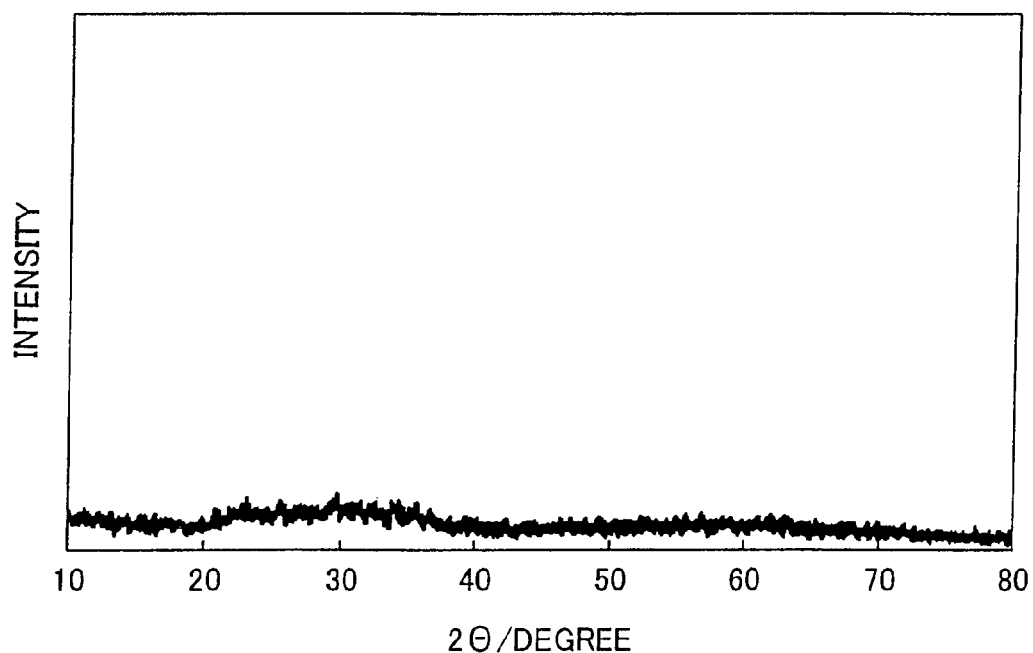
FIG. 2 is a typical XRD pattern of electrode active material obtained by Example 1.
Figure 3:
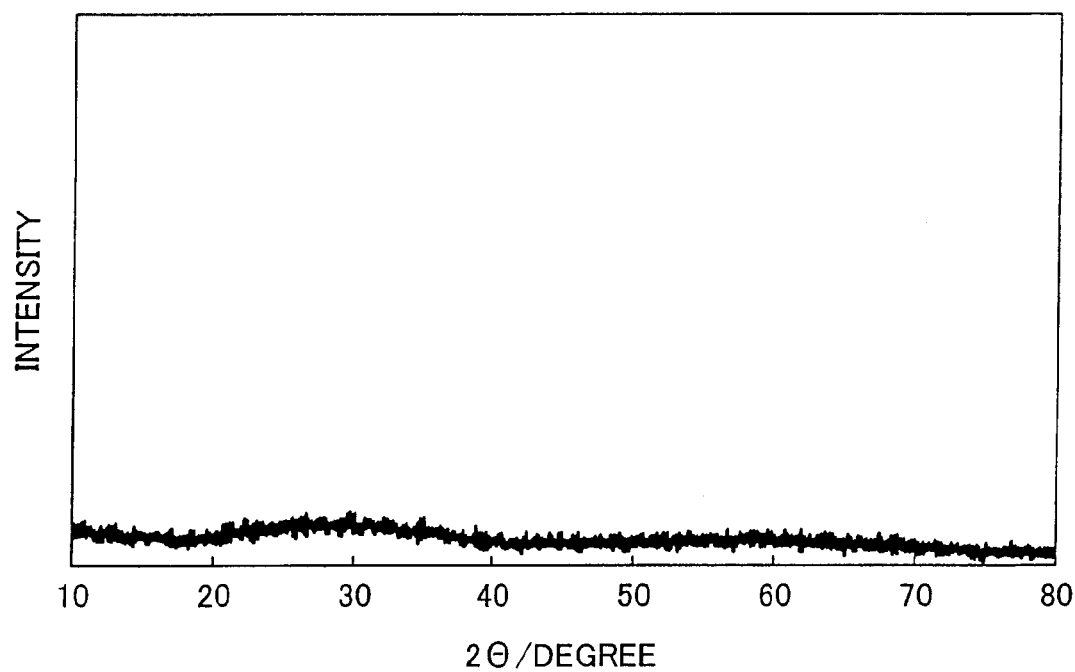
FIG. 3 is a typical XRD pattern of electrode active material obtained by Example 2.
Figure 4:
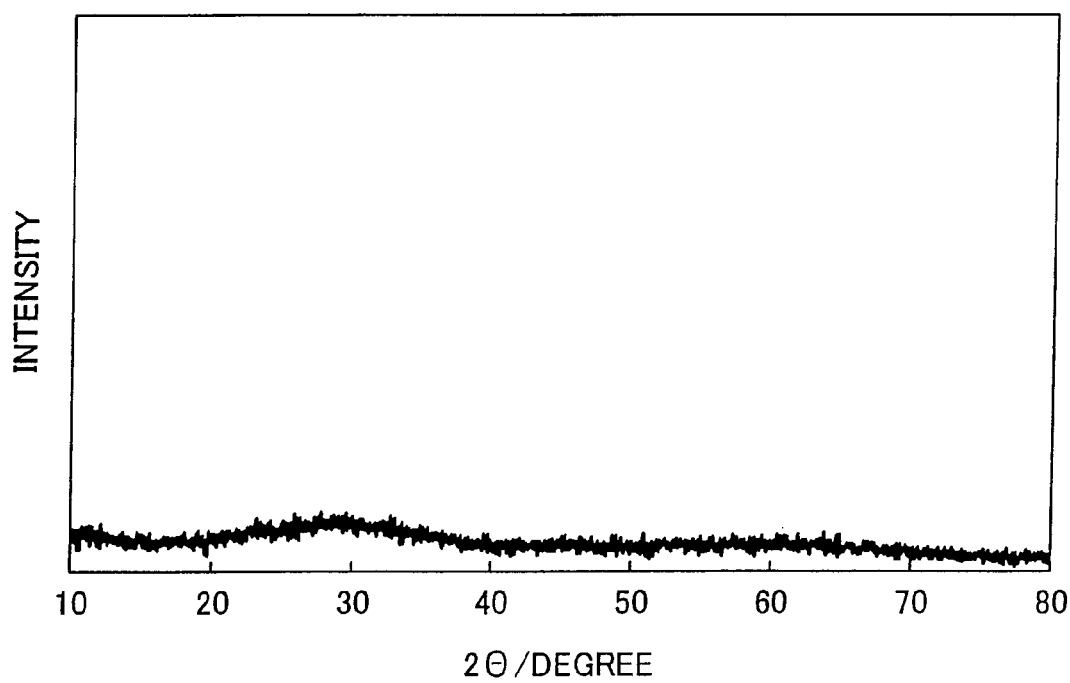
FIG. 4 is a typical XRD pattern of electrode active material obtained by Example 3.
Figure 5:
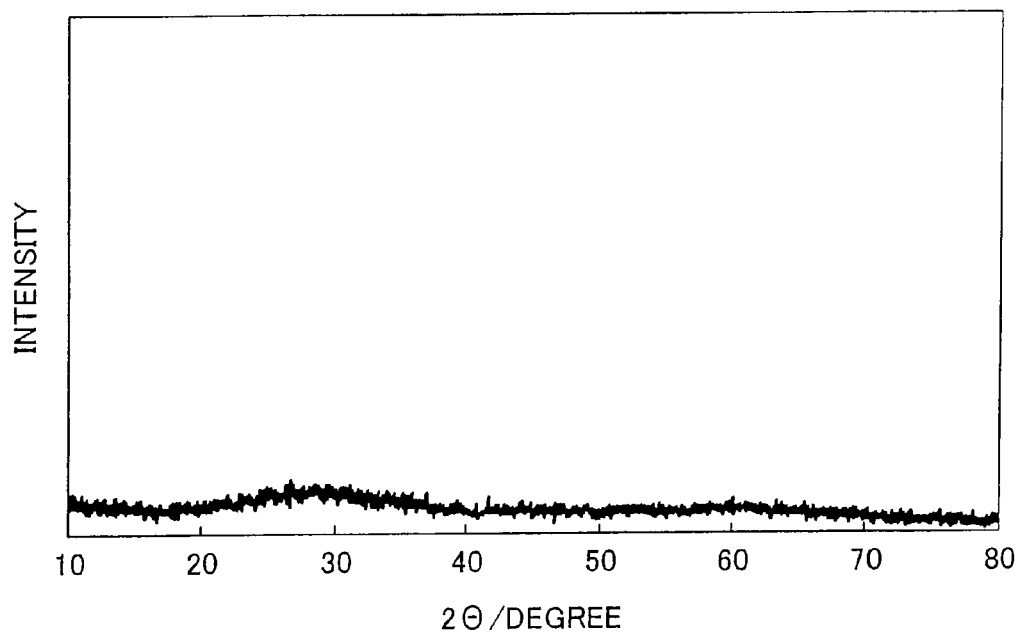
FIG. 5 is a typical XRD pattern of electrode active material obtained by Comparative example 1.

Next, the X-Ray Diffraction Patterns of the Amorphous Electrode Active Materials $Li_xFeP_yO_z$ obtained by Examples 1 to 3 and Comparative example 1 were measured under the following conditions: Apparatus used: Rigaku, RAD-X; X-ray: CuKα, 40 kV, 40 mA; scan range: 2θ=10° to 80°. The X-ray diffraction patterns of the amorphous electrode active materials that were obtained by these measurements are shown in FIG. 2 (Example 1), FIG. 3 (Example 2), FIG. 4 (Example 3), and FIG. 5 (Comparative example 1). As a result of assessing the electrode active materials obtained from Examples 1 to 3 and Comparative example 1 using X-ray diffraction, as shown in FIGS. 2 to 5, only X-ray diffuse scattering specific to amorphous material could be seen in all of the electrode active materials. Therefore all of the obtained electrode active materials were confirmed to be amorphous, no crystalline material was confirmed.

(Raman Spectroscopy Measurement)

Figure 6:
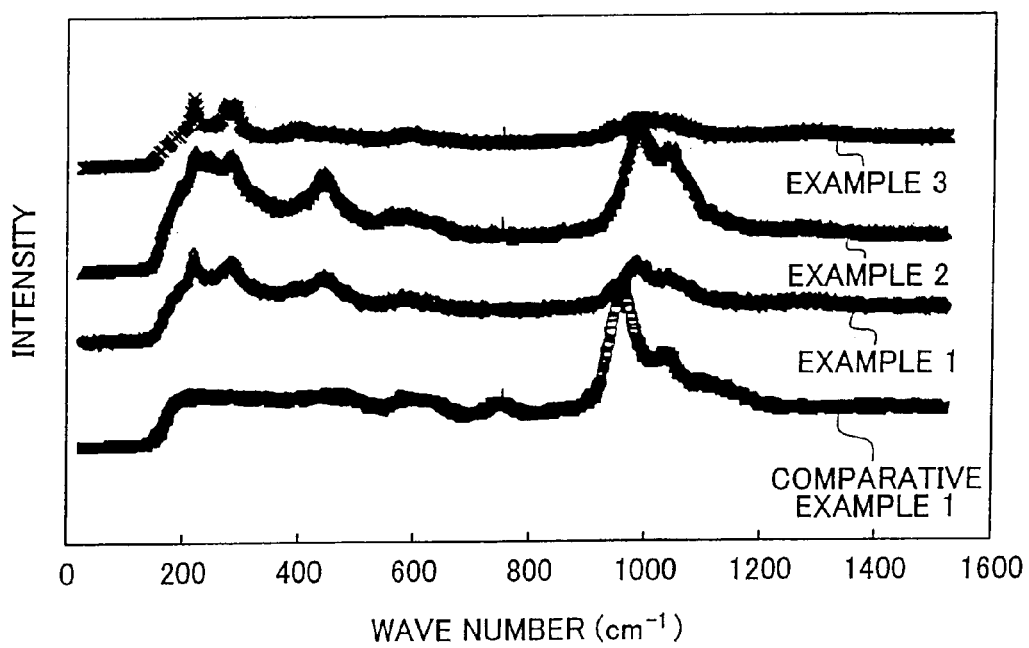
FIG. 6 is a Raman spectroscopy of the electrode active materials obtained from Examples 1 to 3 and Comparative example 1.

Next, the Raman spectroscopy of each of the amorphous electrode active materials $Li_xFeP_yO_z$ obtained by Examples 1 to 3 and Comparative example 1 was measured under the following conditions: Apparatus used: Nanofinder by Tokyo Instruments Inc.; Laser beam: wavelength of 448 nm, output of 2.6 mW, Ar laser. The results of the Raman spectroscopy obtained by these measurements are shown in FIG. 6. As shown in FIG. 6, the amorphous electrode active materials in Examples 1 to 3 that underwent the ball mill processing had peaks near 220 $cm^{-1}$. Also, it was confirmed that the ball mill process resulted in an increase in the peak intensity (I220) of 220 $cm^{-1}$ and a decrease in the peak intensity (I980) of 980 $cm^{-1}$. That is, the ball mill process brought about a change in the peak intensity ratio (I220/I980). The peak intensity ratios (I220/I980) of the Examples 1 to 3 in which the ball mill process was performed were as follows: (I220/I980)=1.07 in Example 1, (I220/I980)=0.89 in Example 2, (I220/I980)=1.17 in Example 3, and (I220/I980)=0.59 in Comparative example 1 in which the ball mill process was not performed. From these changes in the peak intensity ratio (I220/I980), it was confirmed that the ball mill process brought about a change in the short-range order of the amorphous structure.

(Charging and Discharging Characteristics)

Figure 7:
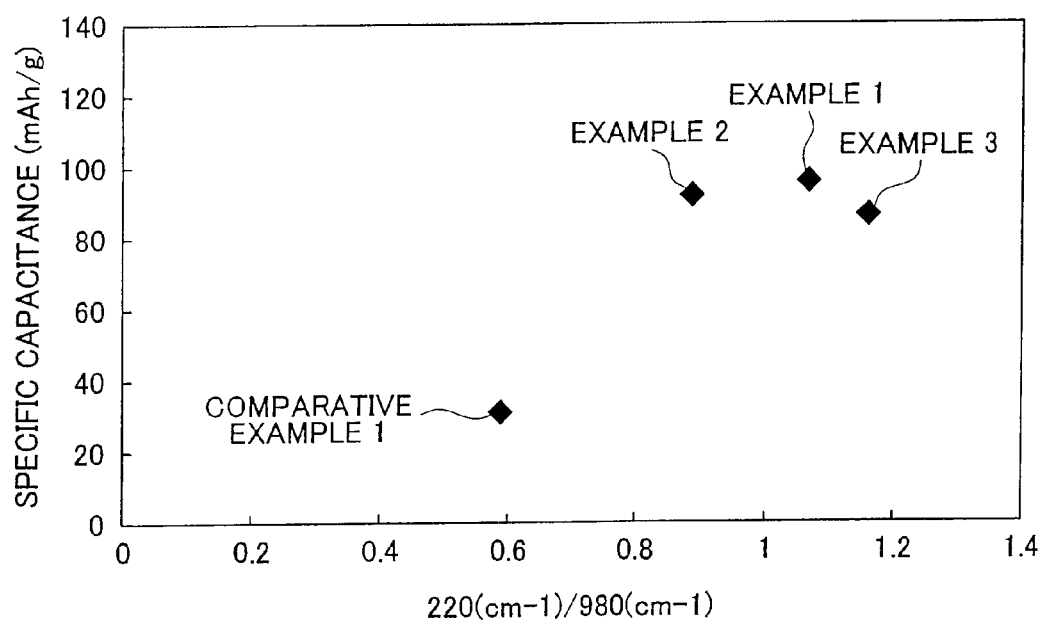
FIG. 7 is a graph showing the relationship between the peak intensity ratio of the Raman spectroscopy and the specific capacitance of lithium secondary batteries using the electrode active materials obtained by Examples 1 to 3 and Comparative example 1.

Test coin cells (2032 type coin cells) were manufactured using the foregoing electrode active materials obtained by Examples 1 to 3 and Comparative example 1. That is, 0.0105 grams of polytetrafluoroethylene (PTFE) as the binder was added to 0.2 grams of combined electrode active material sample as the electrode active material and carbon (acetylene black) as the conducting material such that the mass ratio of electrode active material to conducting material (i.e., carbon) to binder (PTFE) was 70:25:5. These were then mixed together using an agate mortar and an agate pestle. A test electrode was then manufactured by pressing 0.01 gram of this mixture onto SUS (stainless steel) mesh so that it was affixed thereto. Metal Li was used as the counter electrode and a 25 μm thick polyethylene (PE) separator (Ube Industries, Ltd.) was used for the separator. Also, for the electrolyte solution, a mixture was used in which lithium hexafluorophosphate ($LiPF_6$) as a supporting salt was mixed at a concentration of 1 mol/L in with a mixed solvent with a volume ratio of 3:7 of ethylene carbonate (EC) and diethyl carbonate (DEC). The test coin cells were manufactured using these constituent elements. Charging and discharging with a constant current (CC) of a current density of 0.2 ($\mu A/cm^2$) within a voltage range of 2.5 to 4.5 V was then performed with these test coin cells and the specific capacitance was measured. The relationship between the peak intensity ratios (I220/I980) of the peak intensities (I220) of 220 $cm^{-1}$ to the peak intensities (I980) of 980 $cm^{-1}$ in the Raman spectroscopy measurements that are illustrated in FIG. 6 and the specific capacitances of the electrode active materials is shown in FIG. 7. In this case, the peak intensity ratios (I220/I980) of Examples 1 to 3 and Comparative example 1 are as follows: (I220/I980)=1.07 in Example 1, (I220/I980)=0.89 in Example 2, (I220/I980)=1.17 in Example 3, and (I220/I980)=0.59 in Comparative example 1.

As shown in FIG. 7, in Examples 1 to 3 which have peaks near 220 $cm^{-1}$ in the Raman spectroscopy measurements and in which the peak intensity ratio (I220/I980) of the peak intensity (I220) of 220 $cm^{-1}$ to the peak intensity (I980) of 980 $cm^{-1}$ in the Raman spectroscopy measurements exceeds 0.6, the specific capacitances were 96 mAh/g in Example 1, 92 mAh/g in Example 2, and 87 mAh/g in Example 3. That is, the capacitances were able to be increased. In contrast, in Comparative example 1 which does not have a peak near 220 $cm^{-1}$ in the Raman spectroscopy measurement and in which the peak intensity ratio (I220/I980) does not exceed 0.6, the specific capacitance was 0.31 mAh/g. That is, the capacitance was not able to be increased.

As is evident from these results, the capacity of amorphous electrode active material can be increased by making the amorphous electrode active material have a peak near 220 $cm^{-1}$ in Raman spectroscopy. This peak is achieved by changing the short-range order of the amorphous structure through the application of mechanical energy using the ball mill process. Also, high capacity electrode active material can be obtained with amorphous electrode active material by changing the short-range order of the amorphous structure through the application of mechanical energy using the ball mill process so that the peak intensity ratio (I220/I980) of the peak intensity (I220) of 220 $cm^{-1}$ to the peak intensity (I980) of 980 $cm^{-1}$ in the Raman spectroscopy measurement exceeds 0.6.

The invention claimed is:

1. Electrode active material comprising:
an amorphous transition metal complex, as a main constituent of the electrode active material, represented by $A_xMP_yO_z$ (where x and y are values which independently satisfy 0<x<2 and 0<y<2, respectively, and z=(x+5y+valence of M)/2 to satisfy stoichiometry; also, A is an alkali metal and M is a metal element selected from transition metals); wherein
the electrode active material further comprises a conductivity modifier including carbon, and
the electrode active material has a peak near 220 $cm^{-1}$ in Raman spectroscopy, the peak representing a change in the short-range order of the amorphous structure of the amorphous transitional metal complex, and has an average particle size of 1.3-1.7 μm.

2. The electrode active material according to claim 1, wherein a peak intensity ratio of a peak intensity (I220) of 220 $cm^{-1}$ to a peak intensity (I980) of 980 $cm^{-1}$ in Raman spectroscopy is (I220/I980)>0.6.

3. A nonaqueous electrolyte secondary battery comprising: the electrode active material according to claim 1.

4. A manufacturing method of electrode active material having as a main constituent an amorphous transition metal complex represented by $A_xMP_yO_z$ (where x and y are values which independently satisfy 0≤x≤2 and 0≤y≤2, respectively, and z=(x+5y+valence of M)/2 to satisfy stoichiometry; also, A is an alkali metal and M is a metal element selected from transition metals), the manufacturing method comprising:

amorphising a transition metal complex for obtaining the amorphous transition metal complex by rapidly cooling a melt having the $A_xMP_yO_z$ composition; and then changing a short-range order of an amorphous structure by performing a process of applying mechanical energy, and adding a conductivity modifier to the amorphous electrode active material before completing the process of applying mechanical energy, wherein the electrode active material has a peak near 220 cm−1 in Raman spectroscopy and has an average particle size of 1.3-1.7 μm, wherein the process of applying mechanical energy is performed using a ball mill, and wherein the conductivity modifier comprises carbon.

5. The manufacturing method of electrode active material according to claim 4, wherein the relative portion of the electrode active material and the carbon is 70:25 in percentage by mass.

6. The manufacturing method of electrode active material according to claim 4, wherein the carbon includes carbon black, acetylene black, ketjen black, or black lead.

* * * * *